(12) United States Patent
Wang

(10) Patent No.: US 12,452,783 B2
(45) Date of Patent: Oct. 21, 2025

(54) NETWORK SLICE CONNECTION METHOD AND APPARATUS, STORAGE MEDIUM, AND ELECTRONIC APPARATUS

(71) Applicant: ZTE CORPORATION, Guangdong (CN)

(72) Inventor: Cheng Wang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 344 days.

(21) Appl. No.: 18/255,084

(22) PCT Filed: Nov. 8, 2021

(86) PCT No.: PCT/CN2021/129363
§ 371 (c)(1),
(2) Date: May 30, 2023

(87) PCT Pub. No.: WO2022/142740
PCT Pub. Date: Jul. 7, 2022

(65) Prior Publication Data
US 2024/0031928 A1   Jan. 25, 2024

(30) Foreign Application Priority Data
Dec. 29, 2020   (CN) .................. 202011608100.4

(51) Int. Cl.
*H04W 48/18* (2009.01)
*H04W 48/08* (2009.01)

(52) U.S. Cl.
CPC ........... *H04W 48/18* (2013.01); *H04W 48/08* (2013.01)

(58) Field of Classification Search
CPC ... H04W 48/18; H04W 48/08; H04W 12/033; H04W 12/06; H04W 48/16; H04W 76/10
See application file for complete search history.

(56) References Cited

U.S. PATENT DOCUMENTS

| | | | |
|---|---|---|---|
| 9,002,351 B2 * | 4/2015 | Bozionek | H04W 4/16 455/432.1 |
| 10,602,422 B1 | 3/2020 | Jagannatha et al. | |

(Continued)

FOREIGN PATENT DOCUMENTS

| | | |
|---|---|---|
| CN | 109429277 A | 3/2019 |
| CN | 109891832 A | 6/2019 |

(Continued)

OTHER PUBLICATIONS

International Search Report and Written Opinion dated Jan. 26, 2022 in corresponding International Application No. PCT/CN2021/129363, translated, 17 pages.

(Continued)

*Primary Examiner* — Julio R Perez
(74) *Attorney, Agent, or Firm* — MH2 TECHNOLOGY LAW GROUP LLP

(57) ABSTRACT

A network slice connection method includes: acquiring a network slice activation request of an application, where the network slice activation request carries an application user identity (UID) and a slice traffic descriptor identity; determining a system to which the application belongs according to the UID, and acquiring a target application package name corresponding to the UID from the system to which the application belongs; determining a first slice level range that corresponds to the target application package name and is allowed to be used by the application; and establishing a network slice connection according to the first slice level range and the slice traffic descriptor identity.

19 Claims, 7 Drawing Sheets

(56) References Cited

U.S. PATENT DOCUMENTS

| | | | | |
|---|---|---|---|---|
| 11,627,137 B2* | 4/2023 | Chauhan | | H04L 63/108 |
| | | | | 726/4 |
| 12,369,113 B2* | 7/2025 | Liu | | H04W 48/18 |
| 2016/0036786 A1* | 2/2016 | Gandhi | | H04W 12/06 |
| | | | | 713/168 |
| 2017/0367036 A1 | 12/2017 | Chen et al. | | |
| 2020/0112492 A1 | 4/2020 | Chatras et al. | | |
| 2020/0382605 A1* | 12/2020 | Ouyang | | H04W 40/20 |
| 2021/0068044 A1* | 3/2021 | Chan | | H04W 48/18 |
| 2022/0210729 A1 | 6/2022 | Yu | | |
| 2023/0362802 A1* | 11/2023 | Suh | | H04W 48/08 |
| 2024/0031928 A1* | 1/2024 | Wang | | H04W 48/08 |
| 2025/0113395 A1* | 4/2025 | Starsinic | | H04W 28/0925 |

FOREIGN PATENT DOCUMENTS

| | | | | |
|---|---|---|---|---|
| CN | 110720203 A | 1/2020 | | |
| CN | 111416745 A | 7/2020 | | |
| CN | 111865872 A | 10/2020 | | |
| CN | 112804679 A | 5/2021 | | |
| EP | 4221357 A1 * | 8/2023 | | H04W 40/24 |
| EP | 4496385 A1 * | 1/2025 | | H04W 60/06 |
| JP | 2022535933 A | 8/2022 | | |
| WO | 2019007345 A1 | 1/2019 | | |
| WO | 2019075848 A1 | 4/2019 | | |
| WO | 2020040752 A1 | 2/2020 | | |
| WO | 2020247764 A1 | 12/2020 | | |
| WO | WO-2021132190 A1 * | 7/2021 | | H04W 88/06 |
| WO | WO-2025083321 A1 * | 4/2025 | | H04W 40/02 |

OTHER PUBLICATIONS

ZTE et al. "S2-183923, Key Issues considerations to support isolated and coexisted slices," 3GPP tsg_sa\WG2_Arch, Apr. 20, 2018, 5 pages.

ZTE et al. "S2-183180, Key Issues considerations to support isolated and coexisted slices," 3GPP tsg_sa\WG2_Arch, Apr. 20, 2018, 4 pages.

Rapporteur Huawei. "S5-183024, Minutes of Provisioning of 5G networks and network slicing OAM Rapporteur Report," 3GPP tsg_sa\WG5_TM, May 18, 2018, 10 pages.

Chinese First Office Action dated Mar. 16, 2022 in corresponding Chinese Application No. 202011608100.4, translated, 12 pages.

Rapporteur Huawei. "S5-182024, Minutes of Provisioning of 5G networks and network slicing OAM Rapporteur Report," 3GPP tsg_sa\WG5_TM, Apr. 9-13, 2018, 9 pages.

Chinese Second Office Action dated Jan. 18, 2023 in corresponding Chinese Application No. 202011608100.4, translated, 6 pages.

Extended European Search Report dated Mar. 25, 2024 in corresponding European Application No. 21913484.8, 7 pages.

Japanese Decision to Grant a Patent dated May 21, 2024 in corresponding Japanese Application No. 2023-533780, translated, 5 pages.

3GPP TS 23.503 V16.7.0, "Technical Specification Group Services and System Aspects; Policy and charging control framework for the 5G System (5GS); Stage 2 (Release 16)," Dec. 17, 2020, 119 pages.

\* cited by examiner

NETWORK SLICE CONNECTION METHOD AND APPARATUS, STORAGE MEDIUM, AND ELECTRONIC APPARATUS

CROSS-REFERENCE TO RELATED APPLICATION(S)

This application is a national phase entry under 35 USC 371 of International Patent Application No. PCT/CN2021/129363 filed on Nov. 8, 2021, and the International Patent Application is filed based on the Chinese Patent Application with the application No. 202011608100.4, filed on Dec. 29, 2020, which claims priority to the Chinese Patent Application, the entire contents of the International Patent Application and the Chinese Patent Application are incorporated herein by reference.

TECHNICAL FIELD

Embodiments of the present disclosure relate to the field of communications, and in particular, to a network slice connection method and apparatus, a storage medium, and an electronic apparatus.

BACKGROUND

The 5G network slicing technology, in simplest understanding, is to cut a physical network into a plurality of virtual end-to-end networks. Each virtual network, including a device, an access network, a transmission network and a core network within the virtual network, is logically independent of one another, and failure of any virtual network will not affect other virtual networks. Each virtual network has different functional characteristics and is oriented to different needs and services. The 5G network slicing technology brings the following values: guaranteeing quality of service of different levels of services, including traditional network indicators such as bandwidth, latency, packet loss, and jitter; enabling a user to obtain a logically independent network, thus network risk is avoided and meanwhile, the leakage is avoided; enabling a user to view a network statistical indicator and status related to his own slice service package.

SUMMARY

Embodiments of the present disclosure provide a network slice connection method. The method includes: acquiring a network slice activation request of an application, where the network slice activation request carries an application user identity (UID) and a slice traffic descriptor identity; determining a system to which the application belongs according to the UID, and acquiring a target application package name corresponding to the UID from the system to which the application belongs; determining a first slice level range that corresponds to the target application package name and is allowed to be used by the application; and establishing a network slice connection according to the first slice level range and the slice traffic descriptor identity.

The embodiments of the present application further provide a network slice connection apparatus. The apparatus includes: a first acquiring module, configured to acquire a network slice activation request of an application, where the network slice activation request carries an application user identity (UID) and a slice traffic descriptor identity; a second acquiring module, configured to determine, according to the UID, a system to which the application belongs, and acquire a target application package name corresponding to the UID from the system to which the application belongs; a determining module, configured to determine a first slice level range that corresponds to the target application package name and is allowed to be used by the application; and a connection establishing module, configured to establish a network slice connection according to the first slice level range and the slice traffic descriptor identity.

The embodiments of the present disclosure further provide a computer-readable storage medium. The storage medium has stored a computer program therein, and the computer program is configured to, upon being executed, perform the steps in any one of the above method embodiments.

The embodiments of the present disclosure further provide an electronic apparatus, including a memory and a processor. The memory has stored a computer program therein, and the processor is configured to run the computer program to perform the steps in any one of the above method embodiments.

DETAILED DESCRIPTION

The network slice is generally categorized into five levels: L0, L1, L2, L3, and L4, in the 5G network slicing technology. For an industry-customized 5G terminal product, a corresponding level of slice (such as L2 for the Internet of Vehicles, L3 for the media, L3 or L4 for the industry users) will be selected according to the industry in the future. However, there is a large development space for terminals in the slicing and grading application technology.

A dual-system with two Android systems is divided into a working system and a living system, and the working system and the living system can be switched to one another. The two systems share a subscriber identity model (SIM for short) card. If the working system is a customized system, only an L3/L4 slice can be used, whereas the living system cannot access the L3/L4 slice of the same SIM card (since a security level of L3/L4 is high), and there is a need for a safe and reliable method to shield an APP (Application) in the living system from initiating a slice request at the L3/L4 level. In addition, such a method is imperceptible to APPs in the working system and the living system, i.e., any purposeful modification is not required at the APP level. At present, no dual-system solution has been released, and the UE Route Selection Policy (URSP for short) rules on the mobile phone side defined by the 5G protocol do not consider the dual-system, and thus, how to match a slice for an application in the dual-system needs to be defined.

However, a solution to the problem of how to implement network slice grading for a dual-system or a multi-system under the demand of non-interference between network slices has not been proposed yet.

Embodiments of the present disclosure provide a network slice connection method and apparatus, a storage medium, and an electronic apparatus, so as to at least solve the problem of how to implement network slice grading for a dual-system or a multi-system under the demand of non-interference between network slices.

Hereinafter, the embodiments of the present disclosure will be described in detail with reference to the drawings and in combination with the embodiments.

It will be noted that the terms such as "first" and "second" in the description and claims and the drawings of the present disclosure are used for distinguishing between similar objects, but not necessarily used for describing a particular sequence or precedence order.

Figure 1:
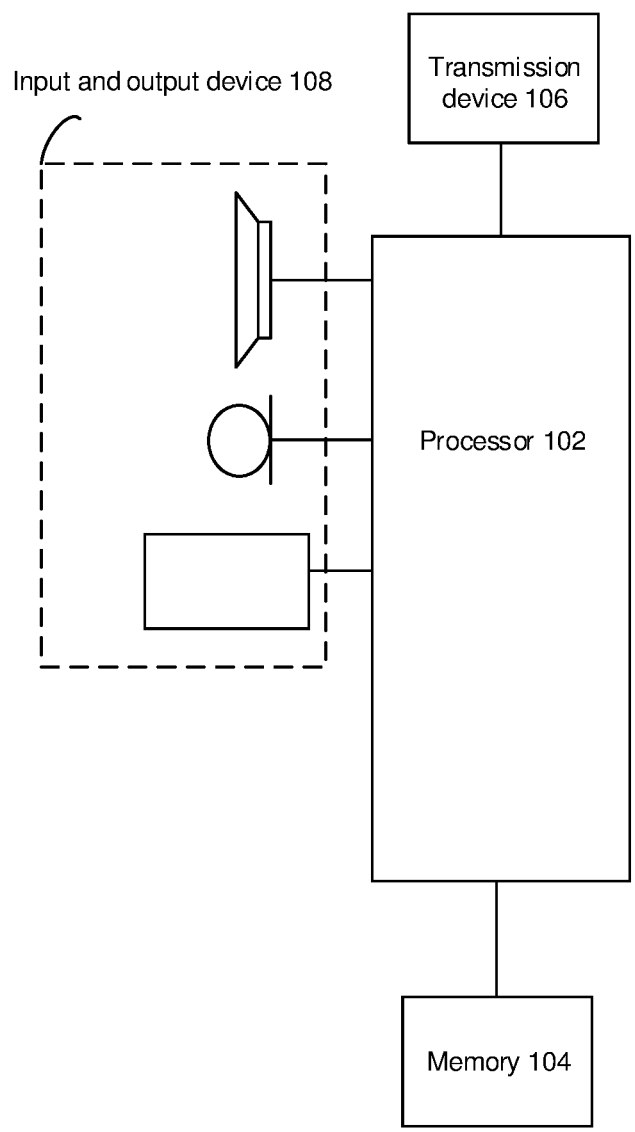
FIG. 1 is a block diagram of a hardware structure of a mobile terminal of a network slice connection method in accordance with an embodiment of the present disclosure.

Method embodiments provided in the embodiments of the present disclosure may be implemented in mobile terminals, computer terminals or similar computing apparatuses. For example, the method embodiments are implemented in a mobile terminal. FIG. 1 is a block diagram of a hardware structure of a mobile terminal implementing a network slice connection method in accordance with an embodiment of the present disclosure. As shown in FIG. 1, the mobile terminal may include one or more (only one is shown in FIG. 1) processors 102 (the processor 102 may include, but is not limited to a processing apparatus such as a microprocessor MCU (Micro Control Unit) or a programmable logic device FPGA (Field Programmable Gate Array)) and a memory 104 for storing data. The above mobile terminal may also include an input and output device 108 and a transmission device 106 for communication functions. It will be understood by those skilled in the art that the structure shown in FIG. 1 is only schematic and does not limit the structure of the above mobile terminal. For example, the mobile terminal may also include more or fewer components than those shown in FIG. 1, or have a different configuration from that shown in FIG. 1.

The memory 104 can be used to store a computer program, for example, a software program and a module of application software, such as a computer program corresponding to the network slice connection method in the embodiments of the present disclosure. By running the computer program stored in the memory 104, the processor 102 executes various functional applications and a service chain address pool slice processing, i.e., realizes the above method. The memory 104 may include a high-speed random access memory, and may also include a non-volatile memory, such as one or more magnetic storage apparatuses, flash memories, or other non-volatile solid-state memories. In some examples, the memory 104 may further include memories that are remotely disposed relative to the processor 102, and these remote memories may be connected to the mobile terminal through a network. Examples of the above network include, but are not limited to, an Internet, an intranet, a local area network, a mobile communication network, and combinations thereof.

The transmission device 106 is configured to receive or transmit data via a network. Specific examples of the above network may include a wireless network provided by a communication provider of the mobile terminal. In an example, the transmission device 106 includes a network interface controller (NIC for short), which may be connected to other network devices through a base station, so as to enable to communicate with the Internet. In an example, the transmission device 106 may be a radio frequency (RF for short) module, which is configured to communicate with the Internet in a wireless manner.

Figure 2:
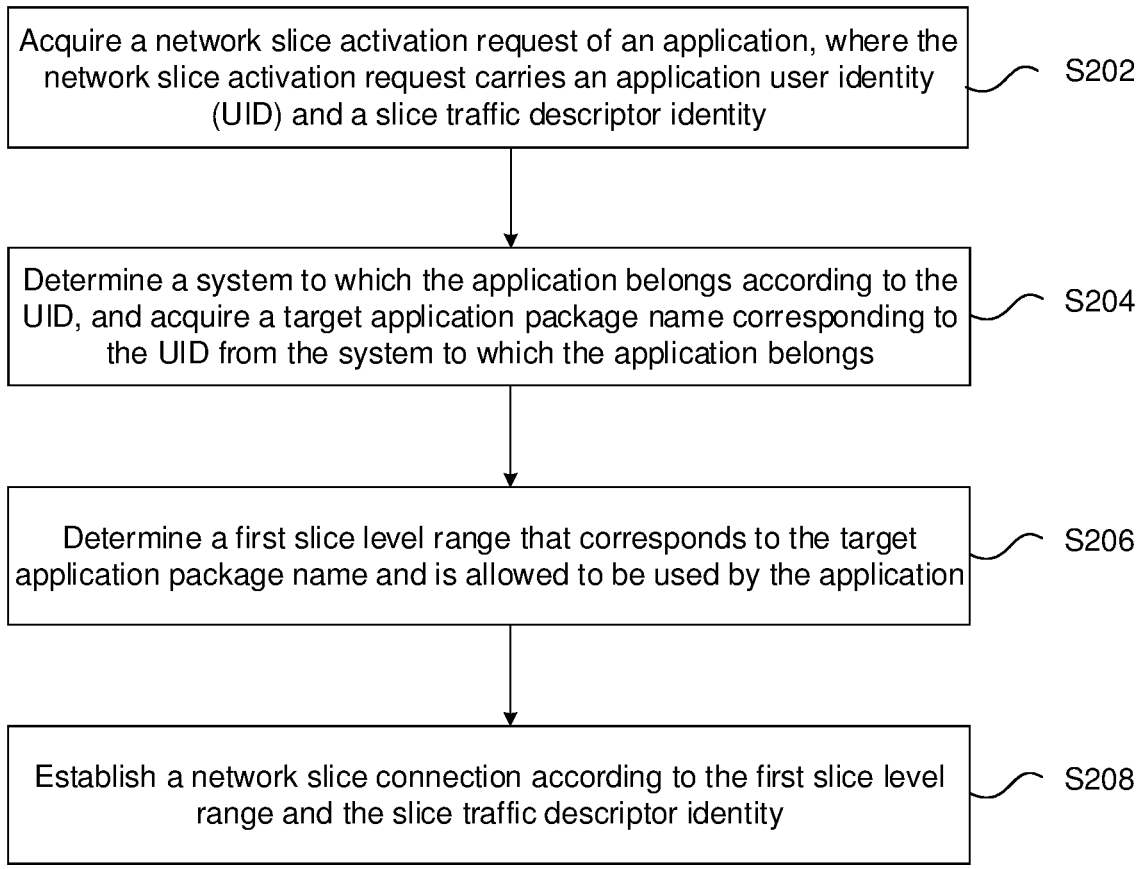
FIG. 2 is a flow chart of a network slice connection method in accordance with an embodiment of the present disclosure.

In this embodiment, a network slice connection method running in the above mobile terminal or network architecture is provided. FIG. 2 is a flow chart of a network slice connection method in accordance with an embodiment of the present disclosure. As shown in FIG. 2, the method includes the following steps.

Step S202: acquiring a network slice activation request of an application, where the network slice activation request carries an application user identity (UID) and a slice traffic descriptor identity.

For example, in a working system and a living system within a dual-system, a same application has different UIDs. Different systems can be distinguished through the UIDs, and a corresponding relationship between a system and a UID can be recorded through a mapping table.

Step S204: determining a system to which the application belongs according to the UID, and acquiring a target application package name corresponding to the UID from the system to which the application belongs.

In an exemplary embodiment, before the above step S204, the method may further include: performing system authentication and identity certification according to system authentication and identity certificating information in a case where the network slice activation request also carries the system authentication and identity certificating information. Only in a case where the system authentication and identity certification are passed, the target application package name corresponding to the UID is acquired, and it is ensured that the system is legal by virtue of the system authentication and identity certification.

In another exemplary embodiment, a corresponding relationship between a UID and an application package name is stored in a system. Specifically, the system can also be directly reflected in the corresponding relationship, i.e., a corresponding relationship of a storage system, a UID and an application package name. The above step S204 may specifically include: determining the target application package name corresponding to the UID according to a preset corresponding relationship between the UID and the application package name.

Step S206: determining a first slice level range that corresponds to the target application package name and is allowed to be used by the application.

The above step S206 may specifically include: determining the first slice level range corresponding to the target application package name based on a pre-established corresponding table of a system identity, an application package name and a slice level. Of course, the system can also be reflected in the corresponding table, that is, the corresponding table records a corresponding relationship of the system, the application package name and the slice level, which may therefore facilitate the determination of the slice level corresponding to the application package name, so as to distinguish network slices of different systems.

Step S208: establishing a network slice connection according to the first slice level range and the slice traffic descriptor identity.

In this embodiment, the above step S208 may specifically include the following steps.

Step S2081: determining a second slice level to which the slice traffic descriptor identity belongs.

The above step S2081 may specifically include: determining the second slice level corresponding to the slice traffic descriptor identity according to a pre-established corresponding table of a slice level and a slice traffic descriptor.

Step S2082: determining whether the application has slice usage permission within the first slice level range according to the second slice level. Specifically, it is determined whether the second slice level belongs to the first slice level range: in a case where the determination result is yes, it is determined that the application has the slice usage permission within the first slice level range; and in a case where the determination result is no, it is determined that the application has no slice usage permission within the first slice level range.

Step S2083: establishing a network slice connection according to the slice traffic descriptor identity in a case where a determination result is yes.

performed according to the slice traffic descriptor identity, thereby network grading slice can be achieved without interfering with each other in the multi-system.

In an exemplary embodiment, corresponding UID allocation ranges are set for a plurality of systems respectively, where the UID allocation ranges of the plurality of systems have no overlap therebetween; and the UIDs are allocated for installed applications in the plurality of systems according to the UID allocation ranges, so that the UIDs configured for different systems are different.

In another exemplary embodiment, after the above step S208, data is encrypted according to the UID or the system authentication and identity certificating information; and the encrypted data is transmitted through the established network slice connection. Since the UID or system authentication and identity certificating information has been known in a stage of the network slice connection, the transmitted data can be encrypted through the UID or the system authentication and identity certificating information, so as to further improve the security of data transmission.

The network slices are classified with five levels, including L0, L1, L2, L3 and L4, as shown in Table 1 below.

TABLE 1

| Slice level | Transmission slice type | Transmission service | Applicable industry |
| --- | --- | --- | --- |
| L0 | VPN sharing + Qos scheduling | 5G 2C Personal traffic service package management | Accessing the internet, Video chatting |
| L1 | VPN sharing + FlexE/MTN Interface isolation (tunnel isolation) | 5G 2C Individual gaming, CloudVR traffic service package service, Industry applications where mobile access areas are not fixed | Cloud gaming, Home CloudVR, Industry applications, Mobile ambulance, UAV, Mobile monitoring, etc. |
| L2 | VPN sharing + FlexE/MTN Interface isolation (tunnel isolation) | 5G 2B vertical industry production services in fixed access areas | Power grid, Manufacturing, Healthcare, Mines, Ports, Internet of Vehicles |
| L3 | VPN sharing + FlexE/MTN interface isolation (tunnel isolation) or end-to-end MTN channel (MTN interface + MTN crossover, E2E physical isolation) | 5G 2B vertical industry production services in fixed access areas | Government-enterprise special line, Meter reading collection, Video surveillance, Media live broadcast |
| L4 | End-to-end MTN channel (MTN interface + MTN crossover, E2E physical isolation) | Fixed 2B platinum private line service (one hop direct) | Government/party, government, military/financial/security special line, Power grid |

The above step S2083 may specifically include: sending a network slice connection request carrying the slice traffic descriptor identity, to a network side; and receiving a network slice connection response sent by the network side, thus the network slice connection is completed.

Through the above steps S202 to S208, the problem of how to implement network slice grading for a dual-system or a multi-system under the demand of non-interference between network slices can be solved. The UIDs applied in different systems are different, and thus network slice activation requests of applications of different systems are distinguished, slice levels that can be used by different systems are determined, and the network slice connection is The industry customization project is characterized by a dual-system, i.e., two Android systems, and the dual-system is divided into a working system and a living system, both of which can be switched to one another. The two systems share a SIM card. If the working system is a government-customized system, only an L3/L4 slice can be used, whereas the living system cannot access the L3/L4 slice of the same SIM card (since a security level of L3/L4 is high), and there is a need for a safe and reliable method to shield an APP in the living system from initiating a slice request at the L3/L4 level. In addition, such a method is imperceptible to APPs in the working system and the living system, i.e., any purposeful modification is not required at the APP level.

Since Google has not released a dual-system solution, and the URSP rules on the mobile phone side defined by the 5G protocol do not consider the dual-system, rules and implementation of how to match slices for applications in the dual-system need to be defined by mobile phone manufacturers themselves. Therefore, there is a need for an innovative solution to solve the above problems. A wireless protocol stack module needs to effectively identify whether the slice request of the application comes from the living system or the working system. The working system only allows a professional industry slice, and the living system only allows a living and entertainment slice.

This embodiment implements the management of graded slices for a dual-system project, distinguishes between application slice requests of different systems, determines a slice level that can be used by the system identity, and meets the requirement that a dual-system mobile phone uses the graded slices without interference between the graded slices. In this embodiment, there is no need to modify application implementation, and only system calls and protocol stack implementation are modified to solve the problems. This embodiment has wide applicability and low cost, is an effective solution for the dual-system project to solve such problems, and thus, the graded slicing function of the dual-system project is improved. This embodiment is applicable to a dual-card smartphone terminal supporting 5G standalone (SA) and a 5G network supporting slice.

Figure 3:
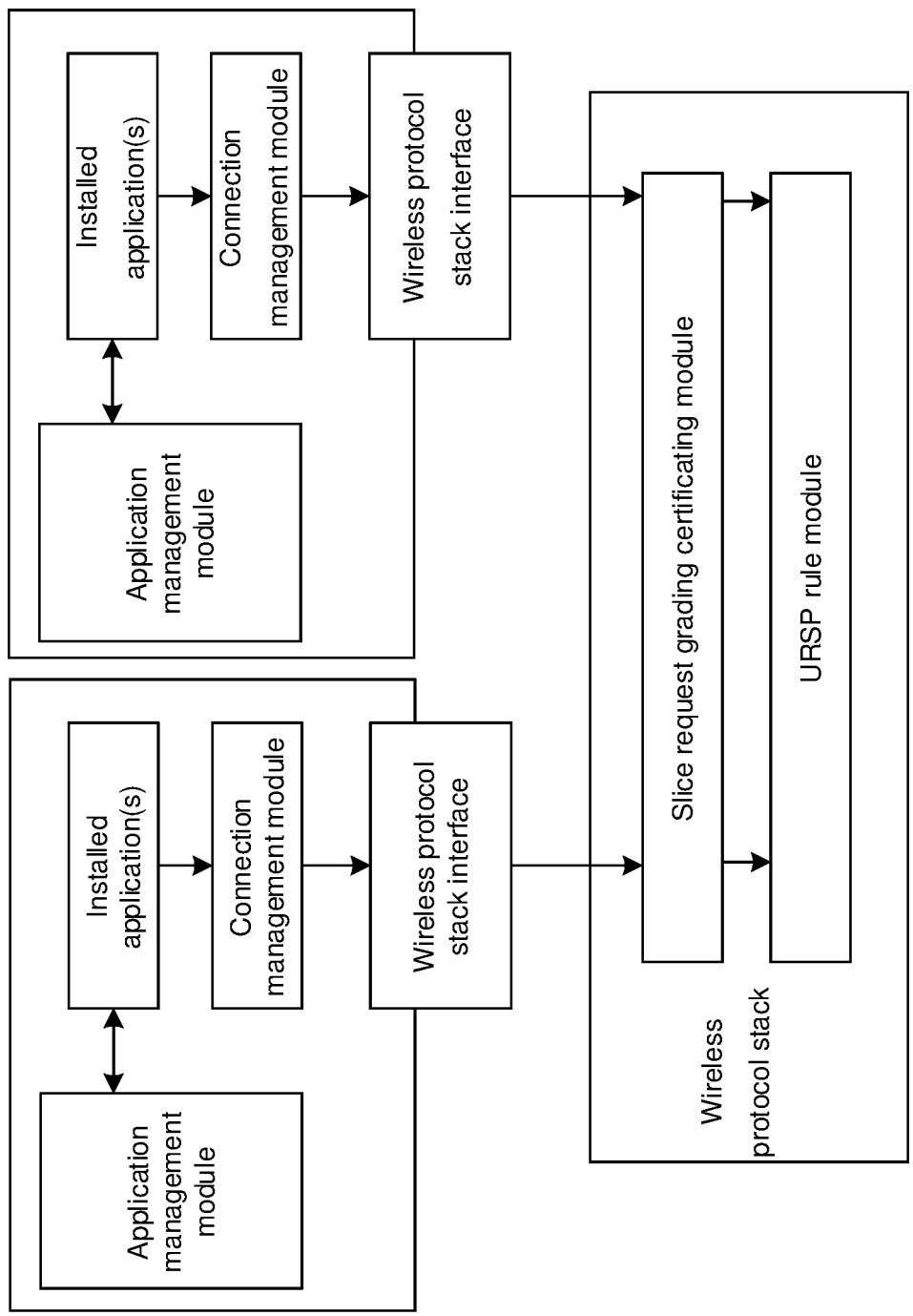
FIG. 3 is a block diagram of a dual-system automatic slice grading control in accordance with an embodiment of the present disclosure.
Figure 4:
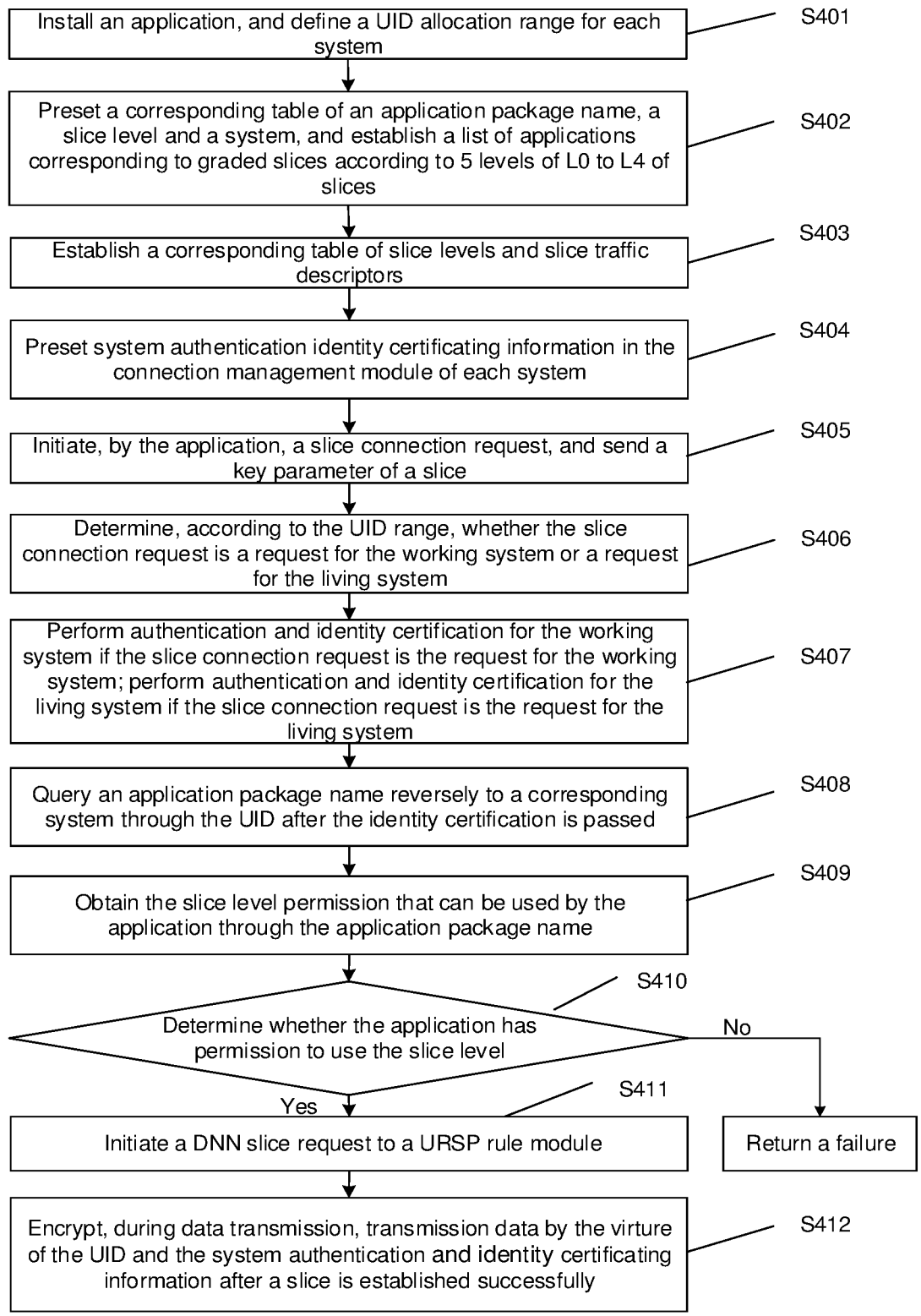
FIG. 4 is a flow chart of a dual-system automatic slice grading control in accordance with an embodiment of the present disclosure.

FIG. 3 is a block diagram of a dual-system automatic slice grading control in accordance with this embodiment. As shown in FIG. 3, a slice request grading certificating module is newly added on the basis of an originally provided framework, so as to realize a main function, and a corresponding modification is performed on original application modules, including an application management module, a connection management module and a wireless protocol stack interface. The slice request grading certificating module is based on the UE route selection policy (URSP for short), and is configured to determine whether the system is allowed to send a corresponding graded slice request, which can be realized in dual-system, and can also be realized in a modem wireless protocol stack. FIG. 4 is a flow chart of a dual-system automatic slice grading control in accordance with this embodiment. As shown in FIG. 4, the dual-system automatic slice grading control includes the following steps.

Step S401: installing an application, and defining a UID allocation range for each system, where for a dual-system project, the application management module defines an allocation range for an application user ID (UID for short) of each system, and the UID ranges of the two systems do not overlap, and the UID ranges can be pre-configured.

Step S402: presetting a corresponding table of an application package name, a slice level and a system in the slice request grading certificating module, and establishing a list of applications corresponding to graded slices according to 5 levels of L0 to L4 of slices. As shown in Table 2, each system has a corresponding level of slice, and each level of slice has a corresponding application. In a single-system project, an application can define its slice level permission to have one level or have multiple levels simultaneously; in a dual-system, an application belonging to a certain system can only have a slice level that its system has, and a slice level with which the living system has permission and a slice level with which the working system has permission are separate, which is a requirement for industry security. An application can be installed both in the working system and the living system, and exists independently of one another in respective operating systems, and UIDs allocated thereto are different.

TABLE 2

| System | Slice level | Application package name |
|---|---|---|
| Living system | L0 | Com.android.1, Com.android.2, Com.android.6 |
| | L1 | Com.android.3, Com.android.4, Com.android.6 |
| | L2 | Com.android.5, Com.android.6 |
| Working system | L3 | Com.android.x, Com.android.y, Com.android.1 |
| | L4 | Com.android.y, Com.android.x, Com.android.6 |

Step S403: obtaining, from the URSP, a set of slices that the network allows the user of the SIM card to use, and establishing a corresponding table of slice levels and slice traffic descriptors. If the URSP does not support slice level categorization in the 3GPP protocol, the corresponding table of slice levels and slice traffic descriptors may also be established through presetting of mobile phone or built-in program setting of mobile phone, as shown in Table 3.

TABLE 3

| Slice level | Slice traffic descriptor |
|---|---|
| L0 | DNN1, DNN2, DNN3, Application ID1 |
| L1 | Application ID2 |
| L2 | DNN4, Application ID3 |
| L3 | DNN5, DNN6 |
| L4 | DNN7, Application ID4 |

Step S404: presetting system authentication and identity certificating information in the connection management module of each system, where the system authentication and identity certificating information is used to perform authentication and identity certification when a slice request is initiated.

Step S405: initiating, by the application, a slice connection request, and sends a key parameter of a slice, where the key parameter includes a data network name (DNN for short) (or other parameters in a slice traffic descriptor which is used to identify a certain slice, the parameters may be a DNN, an Application ID, etc., which is specifically defined in the 3GPP protocol, and the DNN is a representation in the following descriptions herein); the connection management module obtains a UID of a caller, and can initiate a slice connection request carrying a parameter such as a DNN, a UID or system authentication and identity certificating information to the wireless protocol stack interface.

Step S406: sending, by the wireless protocol stack interface, a slice connection request to the slice request grading certificating module, where the slice request grading certificating module determines, according to the UID range, whether the slice connection request is a request for the working system or a request for the living system.

Step S407: performing authentication and identity certification for the working system if the slice connection request is the request for the working system; performing authentication and identity certification for the living system if the slice connection request is the request for the living system; and returning a failure if the authentication and identity certification is not passed.

Step S408: querying an application package name reversely to a corresponding system through the UID after the identity certification is passed.

Step S409: performing permission query in the data table established in step S402 through the application package name, so as to obtain the slice level permission that can be used by the application.

Step S410: querying, according to a DNN initiated by the application, a slice level of the DNN in the data table established in step S403, so as to determine whether the application has permission to use the slice level, and if not, return a failure.

Step S411: initiating a DNN slice request to a URSP rule module.

Step S412: encrypting, during data transmission, transmission data by virtue of the UID and the system authentication and identity certificating information after a slice is established successfully, so as to prevent other applications or other system applications from monitoring slice data streams.

The above steps are applied to the usage of graded slice in a dual-system project, and further, can also be applied to the usage of graded slice in a multi-system, and the security management of the usage of slice in the multi-system, thus, the safe usage of industry slice in industry systems and network restrictions in industry systems are guaranteed.

Figure 5:
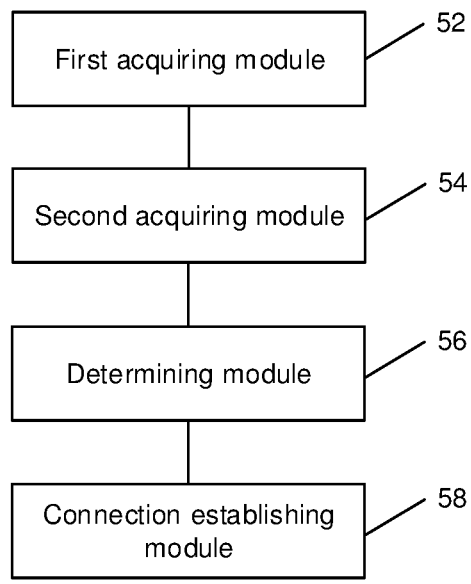
FIG. 5 is a block diagram of a network slice connection apparatus in accordance with an embodiment of the present disclosure.

According to another embodiment of the present disclosure, a network slice connection apparatus is further provided. FIG. 5 is a block diagram of a network slice connection apparatus in accordance with this embodiment. As shown in FIG. 5, the apparatus includes:
 a first acquiring module 52, configured to acquire a network slice activation request of an application, where the network slice activation request carries an application user identity (UID) and a slice traffic descriptor identity;
 a second acquiring module 54, configured to determine, according to the UID, a system to which the application belongs, and acquire a target application package name corresponding to the UID from the system to which the application belongs;
 a determining module 56, configured to determine a first slice level range that corresponds to the target application package name and is allowed to be used by the application; and
 a connection establishing module 58, configured to establish a network slice connection according to the first slice level range and the slice traffic descriptor identity.

Figure 6:
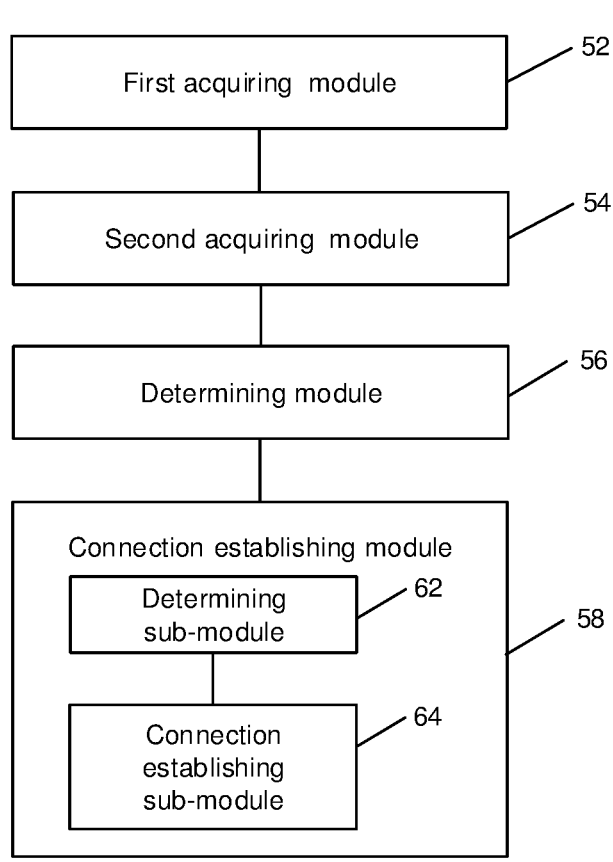
FIG. 6 is a first block diagram of a network slice connection apparatus in accordance with an embodiment of the present disclosure.

FIG. 6 is a first block diagram of a network slice connection apparatus in accordance with an embodiment of the present application. As shown in FIG. 6, the connection establishment module 58 includes:
 a determining sub-module 62, configured to determine a second slice level to which the slice traffic descriptor identity belongs, and determine whether the application has a slice usage permission within the first slice level range according to the second slice level; and
 a connection establishing sub-module 64, configured to establish, in a case where a determination result is yes, a network slice connection according to the slice traffic descriptor identity.

In an exemplary embodiment, the determining sub-module 62 is further configured to:
 determining, according to a pre-established corresponding table of a slice level and a slice traffic descriptor, the second slice level corresponding to the slice traffic descriptor identity;
 determining whether the second slice level belongs to the first slice level range;
 determining that the application has a slice usage permission within the first slice level range, in a case where a determination result is yes; and
 determining that the application has no slice usage permission within the first slice level range, in a case where a determination result is no.

In an exemplary embodiment, the connection establishing sub-module 64 is further configured to:
 sending a network slice connection request carrying the slice traffic descriptor identity, to a network side; and
 receiving a network slice connection response sent by the network side.

In an exemplary embodiment, the apparatus further includes:
 a certificating module, configured to perform, in a case where the network slice activation request further carries system authentication and identity certificating information, system authentication and identity certification according to the system authentication and identity certificating information.

In an exemplary embodiment, the second obtaining module 54 is further configured to determine the target application package name corresponding to the UID according to a preset corresponding relationship between the UID and the application package name.

In an exemplary embodiment, the determining module 56 is further configured to:
 determine the first slice level range corresponding to the target application package name based on a pre-established corresponding table of a system identity, an application package name and a slice level.

Figure 7:
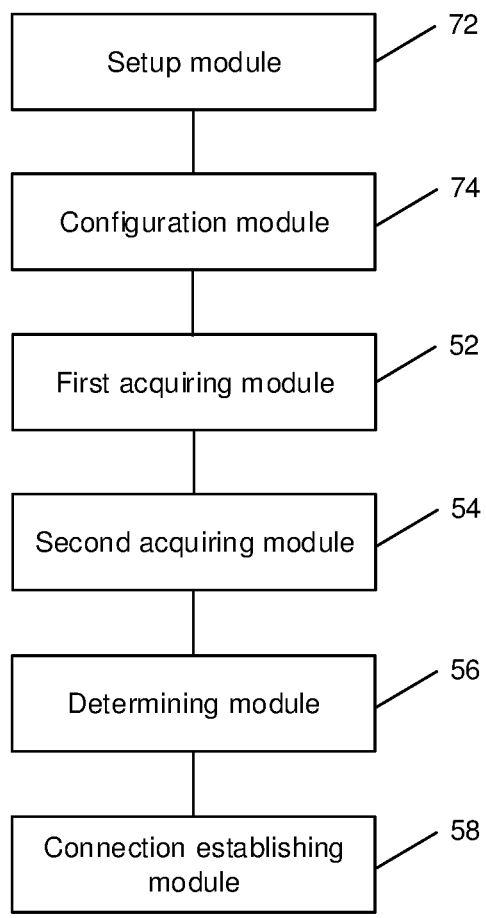
FIG. 7 is a second block diagram of a network slice connection apparatus in accordance with an embodiment of the present disclosure.

FIG. 7 is a second block diagram of a network slice connection apparatus in accordance with an embodiment of the present application. As shown in FIG. 7, the apparatus further includes:
 a setup module 72, configured to set corresponding UID allocation ranges for a plurality of systems respectively, where the UID allocation ranges of the plurality of systems have no overlap therebetween; and
 a configuration module 74, configured to allocate the UIDs for installed applications in the plurality of systems according to the UID allocation ranges.

Figure 8:
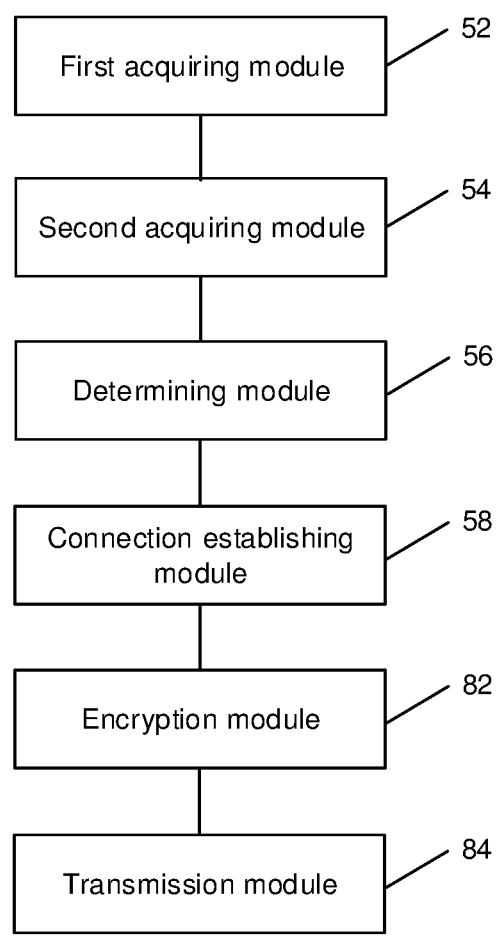
FIG. 8 is a third block diagram of a network slice connection apparatus in accordance with an embodiment of the present disclosure.

FIG. 8 is a third block diagram of a network slice connection apparatus in accordance with an embodiment of the present application. As shown in FIG. 8, the apparatus further includes:
 an encryption module 82, configured to encrypt data according to the UID or the system authentication and identity certificating information; and
 a transmission module 84, configured to transmit the data that is encrypted through the established network slice connection.

The embodiments of the present disclosure further provide a computer-readable storage medium in which a computer program is stored. The computer program is configured to, upon being executed, perform the steps in any one of the above method embodiments.

In an exemplary embodiment, the above computer-readable storage medium may include but is not limited to: a U disk, a read-only memory (ROM for short), a random access memory (RAM for short), a mobile hard disk, a magnetic disk or an optical disk and other media that can store computer programs.

The embodiments of the present disclosure further provide an electronic apparatus, including a memory and a processor. The memory has stored therein a computer program, and the processor is configured to execute the computer program to perform the steps in any one of the above method embodiments.

In an exemplary embodiment, the electronic apparatus may also include a transmission device and an input and output device. The transmission device is connected to the above processor, and the input and output device is connected to the above processor.

For specific examples in this embodiment, reference may be made to the examples described in the above embodiments and exemplary embodiments, and details will not be repeated in this embodiment.

Obviously, those skilled in the art should understand that, the above modules or steps of the present disclosure can be implemented with a general-purpose computing apparatus, and the above modules or steps can be concentrated on a single computing apparatus, or distributed over a network composed of a plurality of computing apparatuses; the above modules or steps can be implemented with program codes executable by a computing apparatus, and thus the above modules or steps can be stored in a storage apparatus to be executed by a computing apparatus; and in some cases, the steps shown or described can be performed in an order different from that shown herein, or the steps are fabricated into individual integrated circuit modules, or a plurality of modules or steps among the above modules or steps are fabricated into a single integrated circuit module for implementation. In this way, the present disclosure is not limited to any particular combination of hardware and software.

The above description is only an embodiment of the present disclosure, and is not intended to limit the present disclosure. For those skilled in the art, the present disclosure may have various modifications and changes. Any modification, equivalent replacement, improvement, etc. made within the scope of the present disclosure shall be included within the scope of protection of the present disclosure.

What is claimed is:

1. A network slice connection method, comprising:
acquiring a network slice activation request of an application, wherein the network slice activation request carries an application user identity (UID) and a slice traffic descriptor identity;
determining a system to which the application belongs according to the UID, and acquiring a target application package name corresponding to the UID from the system to which the application belongs;
determining a first slice level range that corresponds to the target application package name and is allowed to be used by the application; and
establishing a network slice connection according to the first slice level range and the slice traffic descriptor identity.

2. The method according to claim 1, wherein the establishing the network slice connection according to the first slice level range and the slice traffic descriptor identity comprises:
determining a second slice level to which the slice traffic descriptor identity belongs, and determining whether the application has a slice usage permission within the first slice level range according to the second slice level; and
establishing, in a case where a determination result is yes, the network slice connection according to the slice traffic descriptor identity.

3. The method according to claim 2, wherein the determining the second slice level to which the slice traffic descriptor identity belongs, and determining whether the application has the slice usage permission within the first slice level range according to the second slice level comprises:
determining the second slice level corresponding to the slice traffic descriptor identity according to a pre-established corresponding table of a slice level and a slice traffic descriptor identity;
determining whether the second slice level belongs to the first slice level range;
determining that the application has the slice usage permission within the first slice level range in a case where the determination result is yes; and
determining that the application has no slice usage permission within the first slice level range in a case where the determination result is no.

4. The method according to claim 2, wherein the establishing the network slice connection according to the slice traffic descriptor identity comprises:
sending a network slice connection request carrying the slice traffic descriptor identity, to a network side; and
receiving a network slice connection response sent by the network side.

5. The method according to claim 1, wherein before the acquiring the target application package name corresponding to the UID from the system to which the application belongs, the method further comprises:
in a case where the network slice activation request further carries system authentication and identity certificating information, performing system authentication and identity certification according to the system authentication and identity certificating information.

6. The method according to claim 1, wherein the acquiring the target application package name corresponding to the UID from the system to which the application belongs comprises:
determining the target application package name corresponding to the UID according to a preset corresponding relationship of the UID and the application package name.

7. The method according to claim 1, wherein the determining the first slice level range that corresponds to the target application package name and is allowed to be used by the application comprises:
determining the first slice level range corresponding to the target application package name based on a pre-established corresponding table of a system identity, an application package name and a slice level.

8. The method according to claim 1, wherein before the acquiring the network slice activation request of the application, the method further comprises:
setting corresponding UID allocation ranges for a plurality of systems respectively, wherein the UID allocation ranges of the plurality of systems have no overlap therebetween; and
allocating UIDs for installed applications in the plurality of systems according to the UID allocation ranges.

9. The method according to claim 1, wherein after the establishing the network slice connection according to the first slice level range and the slice traffic descriptor identity, the method further comprises:
encrypting data according to the UID or the system authentication and identity certificating information; and
transmitting the data that is encrypted through the established network slice connection.

10. A non-transitory computer-readable storage medium having stored therein a computer program, wherein the computer program, upon being executed, is configured to:
acquire a network slice activation request of an application, wherein the network slice activation request carries an application user identity (UID) and a slice traffic descriptor identity;
determine a system to which the application belongs according to the UID, and acquire a target application package name corresponding to the UID from the system to which the application belongs;
determine a first slice level range that corresponds to the target application package name and is allowed to be used by the application; and
establish a network slice connection according to the first slice level range and the slice traffic descriptor identity.

11. An electronic apparatus, comprising a memory and a processor, the memory having stored therein a computer program, where the processor is configured to run the computer program to:
acquire a network slice activation request of an application, wherein the network slice activation request carries an application user identity (UID) and a slice traffic descriptor identity;
determine a system to which the application belongs according to the UID, and acquire a target application package name corresponding to the UID from the system to which the application belongs;
determine a first slice level range that corresponds to the target application package name and is allowed to be used by the application; and
establish a network slice connection according to the first slice level range and the slice traffic descriptor identity.

12. The method according to claim 3, wherein the establishing the network slice connection according to the slice traffic descriptor identity comprises:
sending a network slice connection request carrying the slice traffic descriptor identity, to a network side; and
receiving a network slice connection response sent by the network side.

13. The method according to claim 2, wherein before the acquiring the target application package name corresponding to the UID from the system to which the application belongs, the method further comprises:
in a case where the network slice activation request further carries system authentication and identity certificating information, performing system authentication and identity certification according to the system authentication and identity certificating information.

14. The method according to claim 3, wherein before the acquiring the target application package name corresponding to the UID from the system to which the application belongs, the method further comprises:
in a case where the network slice activation request further carries system authentication and identity certificating information, performing system authentication and identity certification according to the system authentication and identity certificating information.

15. The method according to claim 4, wherein before the acquiring the target application package name corresponding to the UID from the system to which the application belongs, the method further comprises:
in a case where the network slice activation request further carries system authentication and identity certificating information, performing system authentication and identity certification according to the system authentication and identity certificating information.

16. The method according to claim 2, wherein the acquiring the target application package name corresponding to the UID from the system to which the application belongs comprises:
determining the target application package name corresponding to the UID according to a preset corresponding relationship of the UID and the application package name.

17. The method according to claim 2, wherein the determining the first slice level range that corresponds to the target application package name and is allowed to be used by the application comprises:
determining the first slice level range corresponding to the target application package name based on a pre-established corresponding table of a system identity, an application package name and a slice level.

18. The method according to claim 2, wherein before the acquiring the network slice activation request of the application, the method further comprises:
setting corresponding UID allocation ranges for a plurality of systems respectively, wherein the UID allocation ranges of the plurality of systems have no overlap therebetween; and
allocating UIDs for installed applications in the plurality of systems according to the UID allocation ranges.

19. The method according to claim 2, wherein after the establishing the network slice connection according to the first slice level range and the slice traffic descriptor identity, the method further comprises:
encrypting data according to the UID or the system authentication and identity certificating information; and
transmitting the data that is encrypted through the established network slice connection.

* * * * *